United States Patent [19]

Archibald et al.

[11] Patent Number: 5,504,401
[45] Date of Patent: Apr. 2, 1996

[54] TRANSFORMER REPLACEMENT FOR A SOLID-STATE LIGHTING BALLAST

[75] Inventors: James B. Archibald, Exeter Township, Berks County; John K. Moriarty, Jr., Reading, both of Pa.

[73] Assignee: AT&T Corp., Murray Hill, N.J.

[21] Appl. No.: 330,753

[22] Filed: Oct. 28, 1994

[51] Int. Cl.$^6$ ................................................. H05B 37/02
[52] U.S. Cl. ...................... 315/307; 315/244; 315/224; 315/DIG. 7
[58] Field of Search .................. 315/DIG. 4–DIG. 7, 315/291, 307, 205, 209 R, 219, 224, 244

[56] References Cited

U.S. PATENT DOCUMENTS

| | | | |
|---|---|---|---|
| 3,999,100 | 12/1976 | Dendy et al. | 315/224 |
| 4,039,897 | 8/1977 | Dragoset | 315/205 |
| 5,329,209 | 7/1994 | Nepote | 315/DIG. 7 |

OTHER PUBLICATIONS

"Telefunken Application Note", (Date Unknown) pp. 1 through 6.
"Electronic Ballasts", *PCIM*, Apr. 1987, R. J. Haver, Motorola, Inc., pp. 52 through 56 and 58.
"International Rectifier Application Note 973", (Date Unknown) Peter N. Wood, pp. 229 through 236.
"1.9 Electronic ballast for fluorescent lamps", Siemens (:), (Date Unknown) p. 34.

*Primary Examiner*—Robert J. Pascal
*Assistant Examiner*—Michael Shingleton
*Attorney, Agent, or Firm*—Scott W. McLellan

[57] ABSTRACT

A transformer-less electronic ballast for a gas-discharge lighting system having a power amplifier, with an input, driving a gas-discharge lamp in combination with reactive elements to form a resonant load. The lighting system includes a resistor for sensing current flowing in the resonant load, a comparator having an output coupled to the input of the power amplifier, a non-inverting input coupled to the resistor, and an inverting input coupled to the output of a ramp generator, polarity of the ramp signal being dependent on the output of the comparator. The comparator generates a first signal that is amplified by the power amplifier and applied to the load. The ramp generator generates a ramp signal in response to the first signal. The first signal is asserted by the comparator when the sensed current flowing in the load differs from the ramp signal.

9 Claims, 2 Drawing Sheets

TRANSFORMER REPLACEMENT FOR A SOLID-STATE LIGHTING BALLAST

BACKGROUND OF THE INVENTION

1. Field of the Invention

This invention relates to gas-discharge lighting in general and, more particularly, to electronic ballast circuits used in gas-discharge lighting systems.

2. Description of the Prior Art

Gas discharge lighting, such as sodium vapor or fluorescence lighting, is used where the higher efficiency of gas discharge lighting over incandescent lighting is important, such as in office buildings where there may be thousands of lighting fixtures.

Each gas discharge lighting fixture or system has a ballast which controls the operation of one or more gas discharge lamp therein. The ballast serves to provide the correct voltage and current to the lamp when the fixture is first turned on and thereafter. The ballast is recognized as the component most needing improvement to increase the efficiency of gas discharge lighting.

The initial ballast designs were large transformers and chokes that operated at the power line frequency (e.g.,50 or 60 Hz) and were heavy and dissipated a lot of power. These were replaced with electronic ballasts that still relied on transformers for control and chokes for current limiting, but operated at higher frequencies (tens of KHz) to achieve better efficiencies, reduced weight, and smaller size (the transformers and chokes can be much smaller when operated at the higher frequencies). While the transformer-based electronic ballast is relatively simple, the control transformer may reduce the efficiency of the ballast. Moreover, transformer-based electronic ballast are difficult to design, relying on the magnetic properties of the transformer to achieve the desired voltage and current to the gas discharge lamp on startup and thereafter. Changing the transformer characteristics is an expensive, time consuming, and inexact operation, usually requiring more than two design attempts and tests to insure proper operation.

Thus, it is desirable to provide a ballast design that does not use a transformer.

Further, it is desirable to provide a ballast design that replaces a control transformer with an electronic circuit that synthesizes the function of the transformer.

Still further, it is desirable to provide a ballast design that is readily adaptable for different applications.

SUMMARY OF THE INVENTION

This and other aspects of the invention may be obtained generally in a gas-discharge lighting system having a power amplifier, with an input, driving a gas-discharge lamp in combination with reactive elements to form a resonant load. The lighting system is characterized by a means for sensing a current flowing in the resonant load; a comparator having two inputs and an output, the output coupling to the input of the power amplifier, the first input coupling to the current sensing means; and, a ramp generator, responsive to the output of the comparator, having an output coupling to the second input of the comparator.

Alternatively, the aspects of the invention may be obtained generally by a method of operating a gas-discharge lighting system having a power amplifier, with an input responsive to a first signal, driving a gas-discharge lamp in combination with reactive elements to form a resonant load. The steps include generating a ramp signal in response to a first signal; sensing a current flowing in the resonant load; generating a second signal in response to the sensed current; and generating the first signal when the second signal differs from the ramp signal.

BRIEF DESCRIPTION OF THE DRAWING

The foregoing features of this invention, as well as the invention itself, may be more fully understood from the following detailed description of the drawings, in which.

DETAILED DESCRIPTION

Related pending patent applications, titled "Method of Pre-heating a Gas-Discharge Lamp" and "Method of Operating a Gas-Discharge Lamp And Protecting Same From Damage", Ser. Nos. 08/172,363 and 08/171,501, respectively, by J. K. Moriarty and assigned to the assignee as this application, are examples of transformer-less electronic ballasts and are incorporated herein by reference.

Figure 3:
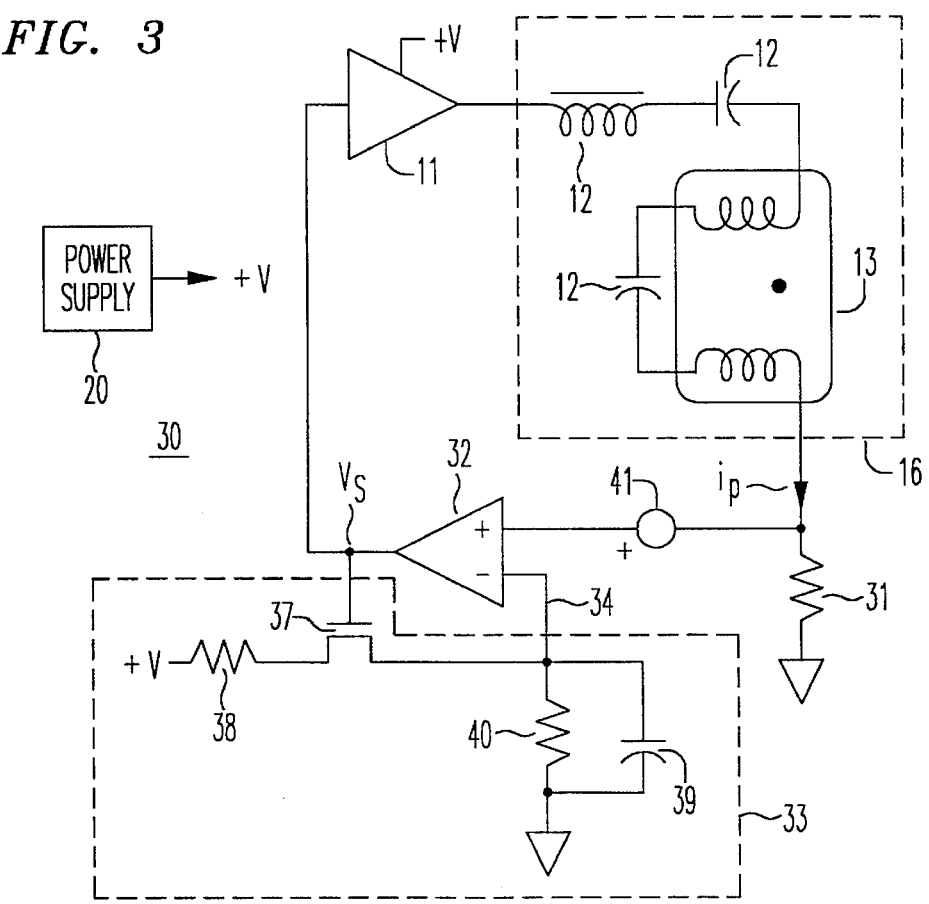
FIG. 3 is a simplified exemplary schematic diagram of a lighting ballast without a transformer, the transformer being replaced by a comparator and a dual-ramp generator.

Generally, the invention may understood by referring to FIG. 3, an exemplary embodiment of the invention. As shown, a gas-discharge lighting system 30 has a power amplifier 11 driving a gas-discharge lamp 13 in combination with reactive components 12 forming a resonant load 16. The lighting system is characterized by a resistor 31 for sensing a current flowing in the resonant load 16, a comparator 32 having an output coupling to the input of the power amplifier 11, and a ramp generator 33 responsive to the output of the comparator 32. The first (non-inverting) input of the comparator 32 is responsive to the voltage developed across the current sensing resistor 31 and the second (inverting) input of the comparator 32 is coupled to the output of the ramp generator 33.

As discussed below in more detail and in accordance with the above described exemplary embodiment of the invention, the current sensing resistor 31, comparator 32 and ramp generator 33 are substituted for the transformer in prior art electronic ballasts. Generally, the comparator 32 generates a first signal that is amplified by the power amplifier 11 and applied to the lamp 13. The ramp generator 33 generates a ramp signal in response to the first signal. The voltage across the resistor 31 is a second signal proportional to the current flowing in the load 16. The first signal is asserted by the comparator 32 when the second signal (the sensed current flowing in the load 16) differs from the ramp signal.

Figure 1:
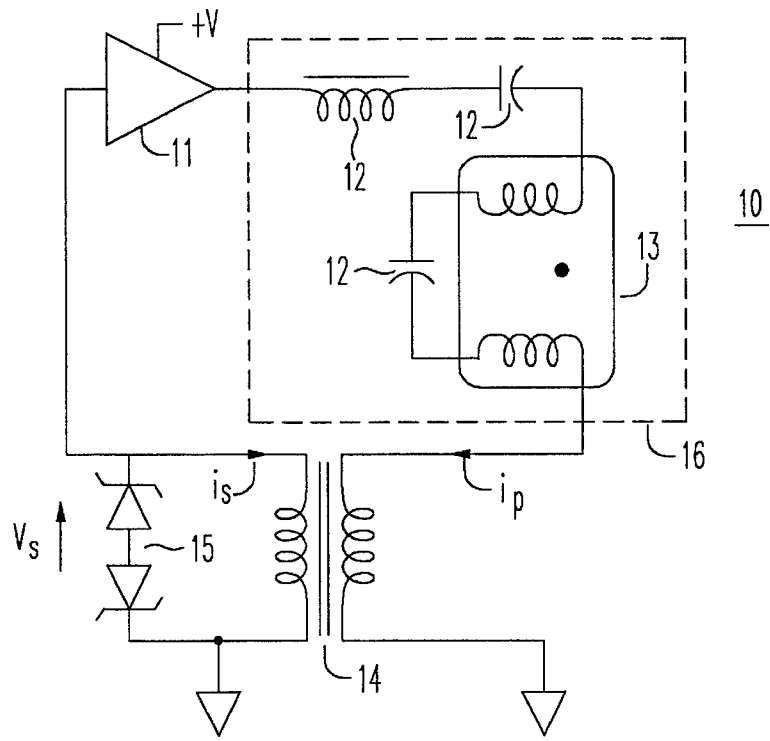
FIG. 1 is a simplified schematic of a prior art gas-discharge lighting system having a transformer as part of the ballast.

In more detail and referring to FIG. 1, an exemplary prior art transformer-based electronic ballast lighting system 10 is shown. The lighting system 10 has a power amplifier 11 driving in combination a resonant circuit 12 and a gas-discharge lamp 13, such as a conventional fluorescent lamp. The power amplifier is generally an FET-based power switch, i.e., it generates a square wave output signal in response to an input signal and has a high input impedance. In series with the lamp 13 is a primary winding of a transformer 14. This winding "senses" the current flowing the load 16 and induces a voltage across the secondary winding of the transformer 14. The voltage across the secondary of the transformer 14 is limited by a voltage limiting diode 15 and the voltage is applied to the input of the power amplifier 11, completing the loop. Generally, the ballast of the lighting system 10 is all the components shown (including a power supply, not shown) excluding the lamp 13.

When the lamp 14 is not ionized, the initial frequency of signal from the power amplifier 11 applied to the lamp 13 is substantially equal to the resonant frequency of the tank circuit 12, transferring substantial amounts of energy to the lamp 13. The frequency is substantially controlled by the magnetizing inductance characteristics of the transformer 14 varying the phase relationship between the current sensed in the load 16 and the output voltage applied to power amplifier 11. The relationship between the current and voltage is largely determined by the magnetic design of the transformer, which is difficult and expensive to change.

Figure 2:
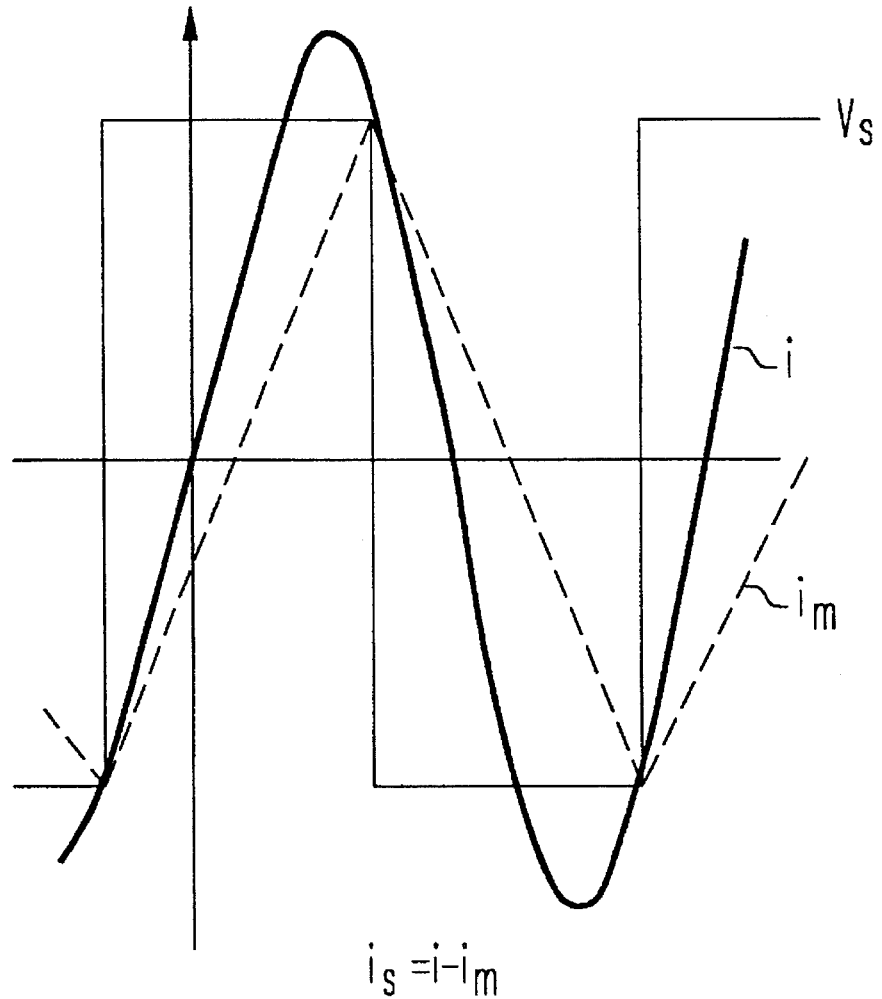
FIG. 2 is a simplified exemplary plot of the various signals in the transformer-based ballast of FIG. 1.

An exemplary relationship between the current in the load 16 and the output voltage (secondary voltage $V_s$) applied to the power amplifier 11 is illustrated in FIG. 2. The typical operating frequency of the system 10 is below the cutoff frequency of the transformer 14 (due to the magnetizing inductance thereof) and the voltage limiting diodes 15 clamps the voltage across the secondary $V_s$. The secondary current $i_s$ in transformer 14 is the difference between the current $i$ coupled from the primary $i_p$ (scaled by the turns ratio of the transformer 14) less the magnetizing current $i_m$. As shown in FIG. 2, the magnetizing current $i_m$ builds slowly due to the magnetizing inductance and the voltage limited by the voltage limiting diodes 15. Thus, the polarity of the voltage $V_s$ is determined by the difference between current $i$ and the magnetizing current $i_m$. For example, when the current $i$ is greater than the magnetizing current $i_m$, the output voltage $V_s$ is positive. Similarly, when the current $i$ is less than the magnetizing current $i_m$, $V_s$ is negative.

To replace the transformer 14 of FIG. 1, a current sensing resistor 31, a comparator 32, and a ramp generator 33 is provided as shown in FIG. 3. As discussed above, the resistor 31 is disposed in series with the load 16 such that the voltage across the resistor 31 proportionately indicates the current $i_p$ through the load 16. It is understood that the current in the load 16 may be sensed anywhere in the combination of lamp 13 and reactive elements 12. Further, it is contemplated that any means of measuring current or voltage anywhere in the resonant load represents a component of current in the resonant load, however small. The value of resistor 31 scales the current from the load 16 similar to the current scaling by the turns ratio of the transformer 14 of FIG. 1. Ramp generator provides a ramping voltage on the output 34 thereof which corresponds to the ramped current $i_m$ of FIG. 2, the polarity of which is dependent on the output signal from the comparator 32. The comparator 32 determines the difference between the ramp signal from generator 33 and voltage across resistor 31 (representing the current in the load 16). Thus, the output signal from the comparator 32 corresponds to the output signal $V_s$ from transformer 14.

The polarity of the output signal from ramp generator 33 is dependent on the state of transistor 37. If transistor 37 conducts, then current from resistor 38 charges capacitor 39. When transistor 37 is not conductive, resistor 40 discharges capacitor 39. The characteristics of the ballast can be changed simply by changing the slope of the ramp signal from generator 33 with changes to capacitor 39 and/or resistors 38 and 40. Offset voltage source 41 may be needed for certain implementations.

Alternatively, the exemplary embodiment of the invention may be understood by the comparator 32 generating two sets of signals: a first signal when the sensed current is greater than the ramp signal and another (third) signal when the ramp signal is greater than the sensed load current. The ramp generator 33 then generates the appropriate slope polarity depending on which signal is asserted by the comparator.

An alternative arrangement for controlling the generation of the ramp signal may eliminate the use of transistor 37 by coupling a signal through a resistor to the inverting input of comparator 34 (e.g., AC coupling from the output of amplifier 11 or comparator 32 to the inverting input of comparator 34). In such a design, offset 41 may not be required.

To reduce variations in the light intensity from the lamp 13 with changes in power supply voltage from supply 20 affecting the amplitude of the signal applied to the lamp 13 from power amplifier 11, the slope of the ramp signal from ramp generator 33 may be made dependent on the voltage from the supply. Thus, when the power supply voltage varies, the slope of the ramp changes, compensating for the variation.

EXEMPLARY RESULTS

A lighting system of the type shown in FIG. 3 has been fabricated and found to operate satisfactorily. Exemplary component values are:

| | |
|---|---|
| resistor 31 | 2 Ω |
| resistor 38 | 350 KΩ |
| resistor 40 | 6 KΩ |
| capacitor 39 | 4.2 nF |

The disclosed circuit is an exemplary embodiment of the invention. It is foreseen that other embodiments may be created. For example, the current sensing resistor 31 may be a winding in a transformer coupling the sensed load current to the comparator 32. Further, other ways of generating a ramp signal can be done. For example, the ramp generator 33 and comparator 32 may be replaced with a digital counter and comparator. Still further, other combinations of resonant circuit 12 and lamp 13 are foreseen.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

We claim:

1. A gas-discharge lighting system having a power amplifier, with an input, driving a gas-discharge lamp in combination with reactive elements to form a resonant load, characterized by:

means for sensing a current flowing in the resonant load;

a comparator having first and second inputs and an output, the output coupling to the input of the power amplifier, the first input coupling to the current sensing means; and, a ramp generator, responsive to the output of the comparator, having an output coupled to the second input of the comparator.

2. The system recited in claim 1, wherein the comparator has an inverting input and a non-inverting input, the first input being the non-inverting input and the second input being the inverting input.

3. The system recited in claim 2, wherein the power amplifier couples to a power supply having a voltage and the ramp generator is responsive to the voltage such that the slope of the ramp is at least partially dependent on the voltage from the power supply.

4. The system recited in claim 3, wherein the resonant load includes an inductor and a capacitor is disposed in combination with the output of the power amplifier and the lamp to form a resonant circuit.

5. The system recited in claim 4, wherein current sensing means is a resistor disposed in series with the lamp, the amount of voltage across the resistor being the second signal and is indicative of the current flowing in the load.

6. The system recited in claim 5, wherein the lamp is a fluorescent lamp having two filaments series coupled with an additional capacitor, the resistor, and the power amplifier.

7. A method of operating a gas-discharge lighting system having a power amplifier, with an input responsive to a first signal, driving a gas-discharge lamp in combination with reactive elements to form a resonant load, characterized by the steps of:

generating a ramp signal in response to a first signal;

sensing a current flowing in the resonant load;

generating a second signal in proportion to the sensed current; and, generating the first signal when the second signal differs from the ramp signal;

wherein the first signal has at least two possible states and the ramp signal polarity is dependent on the state of the first signal.

8. The method as recited in claim 7, further comprising the steps of:

generating in response to a third signal a ramp signal of an opposite polarity to the ramp signal generated in response to the first signal; and generating the third signal when the second signal differs from the opposite polarity ramp signal.

9. The method as recited in claim 8, wherein the power amplifier couples to a power supply having a voltage, and the step of generating a ramp is further characterized by the slope of the ramp being at least partially dependent on the voltage from the power supply.

* * * * *